United States Patent
Mons et al.

(10) Patent No.: US 8,209,834 B2
(45) Date of Patent: Jul. 3, 2012

(54) CENTERING A PART INSIDE A SHAFT

(75) Inventors: Claude Marcel Mons, Savigny le Temple (FR); Laurent Raberin, Paris (FR); Jean-Marc Rongvaux, La Norville (FR); Stéphane Rousselin, Hericy (FR)

(73) Assignee: SNECMA, Paris (FR)

( * ) Notice: Subject to any disclaimer, the term of this patent is extended or adjusted under 35 U.S.C. 154(b) by 635 days.

(21) Appl. No.: 12/354,222

(22) Filed: Jan. 15, 2009

(65) Prior Publication Data
US 2009/0282679 A1    Nov. 19, 2009

(30) Foreign Application Priority Data
Jan. 23, 2008  (FR) ...................... 08 00331

(51) Int. Cl.
B25B 27/14   (2006.01)
B23Q 7/00    (2006.01)
B21K 25/00   (2006.01)
B23P 15/04   (2006.01)
F16C 27/00   (2006.01)
F16C 43/00   (2006.01)

(52) U.S. Cl. ....... 29/281.1; 29/889.2; 29/559; 29/281.5; 384/99; 384/537

(58) Field of Classification Search .......... 29/281.1, 29/278, 271, 281.3, 559, 281.5, 281.6, 283.5, 29/889.2; 269/266, 289 R; 384/537
See application file for complete search history.

(56) References Cited

U.S. PATENT DOCUMENTS

| | | | | |
|---|---|---|---|---|
| 4,099,799 A * | 7/1978 | Fletcher et al. | ................. | 384/12 |
| 5,137,373 A * | 8/1992 | Ide | ................................. | 384/117 |
| 5,316,044 A * | 5/1994 | Szentes et al. | ........... | 137/625.69 |
| 6,360,418 B1 * | 3/2002 | Freeman et al. | ................. | 29/447 |
| 7,384,199 B2 * | 6/2008 | Allmon et al. | ................. | 384/581 |
| 2007/0248293 A1 * | 10/2007 | Pettinato et al. | ................. | 384/99 |

FOREIGN PATENT DOCUMENTS

| | | |
|---|---|---|
| DE | 196 17 539 A1 | 11/1997 |
| DE | 197 57 945 A1 | 7/1999 |
| DE | 102 10 954 A1 | 7/2003 |
| DE | 10 2004 059 188 A1 | 3/2006 |

OTHER PUBLICATIONS

"Shpae-Memory Effect" by Andreas Lendlein and Steffen Kelch, Published on 2002. <http://www.eng.buffalo.edu/Courses/ce435/Lendlein02.pdf>.*

"Shape Memory Alloys and Their Applications" by Richard Lin, Published on Jan. 21, 1996. <http://www.stanford.edu/~richlin1/sma/sma.html>.*

* cited by examiner

*Primary Examiner* — Monica Carter
*Assistant Examiner* — Seahee Yoon
(74) *Attorney, Agent, or Firm* — Oblon, Spivak, McClelland, Maier & Neustadt, L.L.P.

(57) ABSTRACT

A device for centering a tube inside a hollow shaft is disclosed. The device includes a deformable device interposed between the tube and the hollow shaft and including bearing members for bearing against the inside surface of the shaft and suitable for being spaced away from the inside surface of the shaft in order to enable them to be moved inside the shaft. The deformable device is made of a shape-memory material suitable for deforming to press the bearing members against the inside surface of the shaft or to space them away therefrom on being subjected to a predetermined temperature.

6 Claims, 3 Drawing Sheets

CENTERING A PART INSIDE A SHAFT

FIELD OF THE INVENTION

The present invention relates to a device for centering a part inside a shaft, in particular in a turbomachine such as an airplane turbojet.

BACKGROUND OF THE INVENTION

In bypass turbojets, the shaft of the low-pressure turbine is hollow and may contain a tube, commonly referred to as a "center vent" tube that serves to connect the bearings supporting the low-pressure rotor to the outside atmosphere so as to discharge a flow of oil-laden air towards the downstream end of the turbojet.

In general, this tube extends over the entire length of the rotor shaft and its ends are constrained to rotate together with the shaft.

Given its long length and its relatively thin wall, the tube is conventionally supported by one or more centering rings that include means for bearing against the inside wall of the shaft.

Nevertheless, in order to improve the dynamic behavior of the turbojet, the low-pressure compressor shaft generally has an inside diameter that varies, thus presenting shoulders or narrowings.

To enable the centering rings to be put into place inside the shaft at a distance from its ends, the centering rings must be capable of going past these shoulders or narrowings in the inside surface of the shaft.

For this purpose, known centering rings are generally mounted by force using systems of the type comprising screws and spreaders, which can lead to the rings being wrongly positioned and can damage the inside surface of the shaft.

In addition, mounting such rings requires special tooling that is relatively expensive.

Furthermore, known centering rings are too bulky to be suitable for use in turbojets of small size, typically jets having a fan of diameter less than forty inches, i.e. about one meter.

Document DE 10 210 954-A1 describes an engine device comprising a cylindrical cage that is stationary in rotation and that houses a disk that is secured to a rotary shaft. The cage is carried by spokes of shape-memory material, with electricity being passed through the spokes in succession so as to heat them and shorten them in succession, thereby causing the disk to orbit inside the cage and drive the shaft secured to the disk in rotation.

OBJECT AND SUMMARY OF THE INVENTION

A particular object of the invention is to provide a simple, inexpensive, and effective solution to the above-mentioned problems, enabling the drawbacks of the prior art to be avoided.

A particular object of the invention is to provide a device for centering a part, such as a tube, inside a shaft, which device does not require special tooling for putting it into place and does not run the risk of damaging the shaft, and which device is also suitable for being used in turbojets of small size.

To this end, the invention provides a device for centering a part inside a hollow shaft, in particular in a turbomachine, the device comprising deformable means interposed between the part and the hollow shaft and including bearing members for bearing against the inside surface of the shaft, the bearing members being suitable for being spaced away from the inside surface of the shaft to enable them to be moved inside the shaft, wherein the deformable means are made at least in part out of a shape-memory material suitable for pressing the bearing members against the inside surface of the shaft, or for spacing them away therefrom when the material is subjected to a predetermined temperature.

Merely as a result of a change in temperature, the device of the invention can go from a position in which its bearing members are retracted, in which position the device is compact around the part located inside the shaft, to a position in which the bearing members are deployed, thereby enabling the part to be centered relative to the inside wall of the shaft.

In a first embodiment of the invention, the deformable means are initially shaped into a position for bearing against the shaft at a temperature higher than a transition temperature $T_t$ of the shape-memory material, and they are then retracted under mechanical stress at a temperature lower than the transition temperature $T_t$, so as to be capable subsequently, by a single shape-memory effect, of pressing the bearing members against the shaft by deformation of the shape-memory material when it is heated to a temperature higher than the transition temperature $T_t$.

Because the device of the invention is radially compact in its retracted configuration, it is easily inserted into the shaft and can go past any narrowings or shoulders of its inside wall.

Once the device is in place, its bearing members can be deployed against the shaft in order to center the part merely by heating, without any mechanical contact with the device being required.

Preferably, the transition temperature $T_t$ of the shape-memory material is higher than 100° C.

Such a transition temperature serves to minimize any risk of the device deploying in untimely manner.

In a second embodiment of the invention, the deformable means are initially subjected to thermomechanical cycles in which they are shaped in turn in a deployment position at a temperature higher than a transition temperature $T_t$ of the shape-memory material and then in a retraction position at a temperature that is lower than the transition temperature $T_t$, so as to be subsequently suitable for pressing the bearing members against the hollow shaft by the shape-memory material deforming on being heated to a temperature higher than the transition temperature $T_t$, and for retracting the bearing members by the shape-memory material deforming on being cooled to a temperature lower than the transition temperature $T_t$.

This second embodiment relies on implementing a double shape-memory effect that requires a training stage made up of thermomechanical cycles, and it makes it possible both to retract and to deploy the bearing members merely by changing temperature, so as to facilitate and make more reliable not only initial mounting of the device, but also dismantling thereof, e.g. for maintenance operations.

Preferably, the transition temperature $T_t$ lies in the range −90° to −50° C.

Such a transition temperature is lower than the usual temperatures at which an airplane operates, thus making it possible to avoid untimely retractions of the device, while still making it possible to use conventional cooling means, such as liquid nitrogen, for example.

The part may be a tube, such as a venting duct, sometimes referred to as a "center vent" tube, that serves to connect bearings for supporting and guiding the shaft to the outside atmosphere.

In the first embodiment, the deformable means comprise rods of shape-memory material, each having a radially inner end fastened to the outside surface of the tube and a radially outer end carrying a bearing shoe for bearing against the inside surface of the shaft, the radially outer end of each rod being suitable for curving radially inwards by deformation of the shape-memory material in order to move the corresponding bearing shoe away from the inside surface of the shaft.

The structure of the device makes it very light in weight, and makes it possible to use shape-memory material rods that are quite common on the market.

Advantageously, each bearing shoe is in the form of a ring sector suitable for matching the shape of the inside surface of the shaft when in the deployed position, with the set of bearing shoes, when in the retracted position, forming a substantially continuous ring surrounding the tube.

This configuration serves to optimize the centering capacity of the device while minimizing its radial extent.

In the second embodiment, the deformable means comprise a ring of shape-memory material mounted around the tube and capable of taking up an oval or polygonal shape by deformation of the shape-memory material in such a manner that a portion of its inside surface bears against the outside surface of the tube and a portion of its outside surface bears against the inside surface of the shaft in order to center the tube.

The ring acts both as deformable means and as a bearing member, such that the device is particularly good at withstanding wear.

In a third embodiment, the deformable means comprise a ring mounted around the tube and including plates of shape-memory material distributed around the ring, each plate being interposed between the outside surface of the ring and a bearing shoe, and being capable of bending into an arc by deformation of the shape-memory material such that the edges of the plate bear against the outside surface of the ring and a middle portion of the plate pushes the bearing shoe radially outwards against the inside surface of the shaft in order to center the tube.

This configuration serves to limit the quantity of shape-memory material that is used, while making use only of deformations that are geometrically simple, thereby greatly facilitating the prior training stage of the shape-memory material.

Advantageously, the ring includes hollow portions in its outside surface, with the plates of shape-memory material and the bearing shoes resting therein, which shoes preferably present respective radially outer faces that are flush with the outside surface of the ring, when in the retracted position.

This configuration minimizes radial size.

The invention also provides a turbomachine, such as an airplane turbojet, including at least one centering device of the above-described type.

BRIEF DESCRIPTION OF THE DRAWINGS

The invention can be better understood and other details, advantages, and characteristics thereof appear more clearly on reading the following description made by way of non-limiting example with reference to the accompanying drawings, in which.

MORE DETAILED DESCRIPTION

Figure 1:
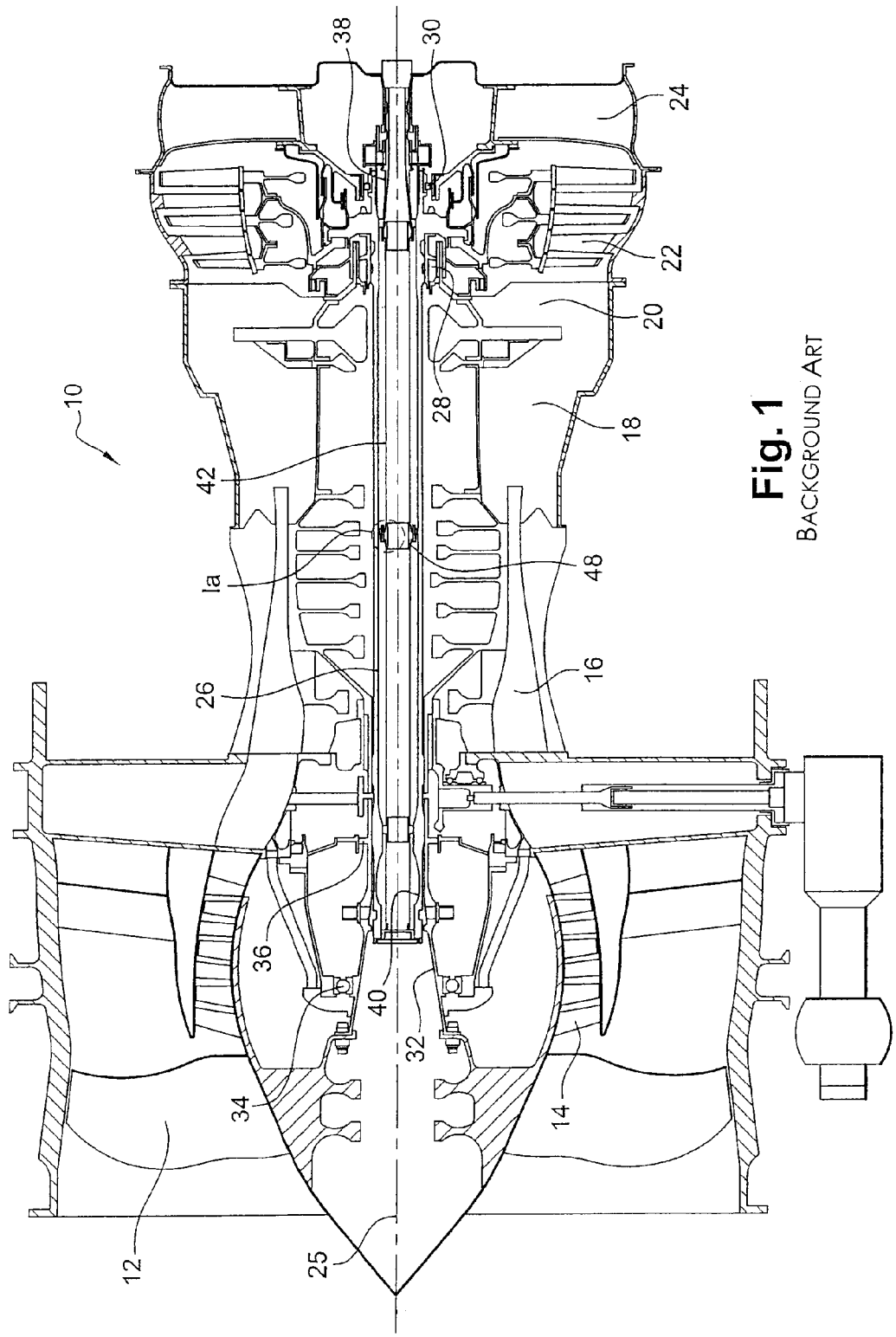
FIG. 1 is a diagrammatic axial section view of a turbomachine of known type.

FIG. 1 shows a known type of airplane bypass turbojet 10 essentially comprising, from upstream to downstream: a fan 12; a low-pressure compressor 14; a high-pressure compressor 16; a combustion chamber extending in an annular space 18; a high-pressure turbine 20; a low-pressure turbine 22; and an exhaust casing 24.

In operation, and in known manner, the rotor of the low-pressure turbine 22 drives a shaft 26 to rotate about an axis 25 of the turbojet, which axis is guided downstream by two bearings 28 and 30 and is surrounded upstream by a shaft 32, itself guided by two bearings 34 and 36 and connected to the fan 12 and to the low-pressure compressor 14, the shaft 26 of the low-pressure turbine 22 is constrained to rotate with the shaft 32 of the fan 12 and of the low-pressure compressor 14 so as to enable them to be driven in rotation.

The shaft 26 of the low-pressure turbine extends from the low-pressure compressor 14 to the low-pressure turbine 22, and it is extended downstream by a duct 38 having its downstream end carried by the exhaust casing 24.

The shaft 26 of the low-pressure turbine is hollow and it has an inside surface 40 that is shaped to optimize the dynamic performance of the turbojet.

The turbojet 10 includes a tube 42, sometimes referred to as a "center vent", that is housed inside the shaft 26 of the low-pressure turbine to connect the upstream bearings 34, 36 and the downstream bearings 28, 30 to the outside atmosphere.

The tube 42 is constrained to rotate with the low-pressure turbine shaft 26 at its upstream end, and with the duct 38 secured to the shaft 26 at its downstream end.

Because of its length and its small stiffness, given its relatively thin wall, the tube 42 presents a risk of bending inside the low-pressure turbine shaft 26, and such bending can lead to unbalance that penalizes the performance of the turbojet 10.

In order to avoid this risk of bending, the tube 42 carries a centering device 48 of known type that is situated in the middle zone of the tube 42, at substantially equal distances from the ends of the tube, for the purpose of centering the tube 42 inside the shaft 26.

Figure 1A:
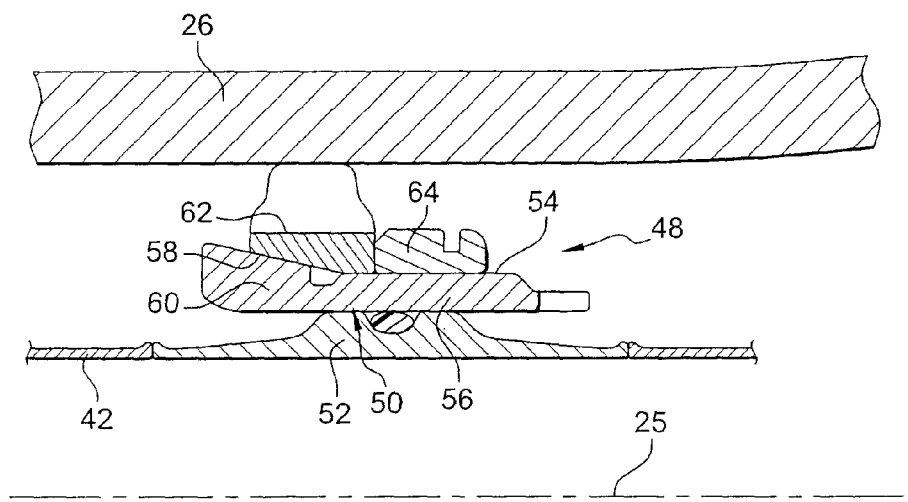
FIG. 1*a* is an enlarged view of a detail Ia of FIG. 1.

As shown in FIG. 1*a*, the centering device 48 comprises a ring 50 mounted about an outer annular projection 52 of the wall of the tube 42, this ring 50 presenting an outside thread 54 at its downstream end 56 and a frustoconical outside wall 58 at its upstream end 60 and of section that tapers downstream.

A resilient split ring 62 with a frustoconical inside wall is mounted around the frustoconical wall 58 of the ring 50 and it is held axially by a nut 64 having an inside thread that matches the thread 54 of the ring.

The resilient split ring 62 is mounted by sliding it around the ring 50 from its downstream end 56 and in the absence of the nut 64, after which the nut 64 is screwed onto the outside thread 54 of the ring 50 so as to cause the split ring 62 to progress upstream while around the frustoconical outside wall 58 of the ring 50, thereby causing the split ring 62 to expand.

By way of example, the split ring 62 presents a peripheral surface of substantially square section including rounded corners of curvature that matches the inside wall 40 of the shaft 26 of the low-pressure turbine, such that the expansion of the split ring 62 causes the corners thereof to bear progressively against the inside surface of the shaft 26, thereby tending to center the tube 42 relative of the shaft 26.

The split ring 62 needs to be mounted after the tube 42 has been positioned inside the low-pressure turbine shaft 26 so as to allow the tube 42 to pass through zones of the shaft that present a diameter smaller than the diameter of the middle zone that is to engage the centering device 48.

As a result, mounting the split ring 62 is found to be difficult and requires the use of special tools that enable the split ring 62 to be put into place and the nut 64 to be screwed inside the shaft 26 at a distance from the ends thereof.

In addition, the above-described centering device 48 is found to be too bulky to enable it to be used in engines of small size, such as engines having a fan with a diameter of less than forty inches, i.e. about one meter.

In order to overcome these drawbacks, the invention proposes a centering device capable of passing from a retracted configuration for use while putting the tube 42 into place inside the low-pressure turbine shaft 26, to a deployed configuration for centering the tube 42 relative to the shaft 26, and without requiring a special mounting tool, the device also being compact, thereby making it compatible with engines of small size.

For this purpose, the proposed centering device comprises deformable means taking advantage of the capacity of certain materials, commonly referred to as shape-memory materials, to change shape under effect of a change in temperature.

Figure 2:
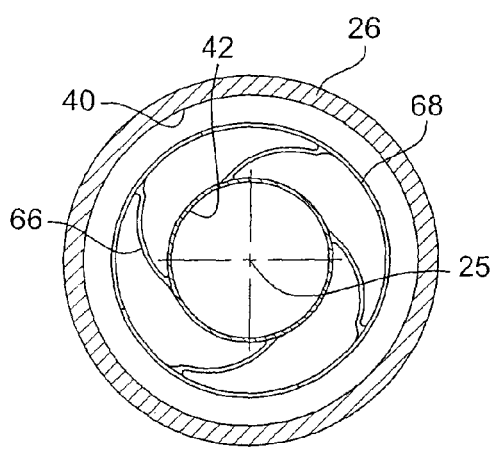
FIGS. 2 and 3 are fragmentary diagrammatic views in cross-section on a larger scale of a low-pressure compressor shaft in a turbomachine including a centering device constituting a first embodiment of the invention, shown respectively in its retracted position and in its deployed position.
Figure 3:
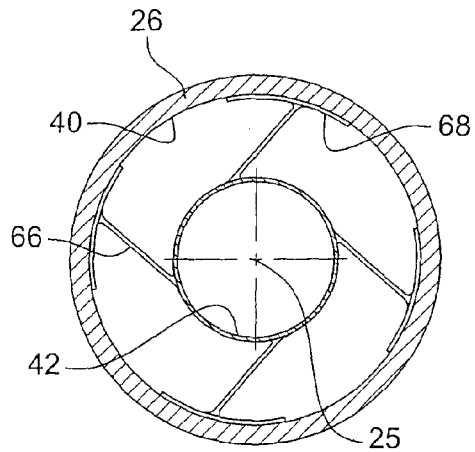

In a first embodiment of the invention, shown in FIGS. 2 and 3, the deformable means are rods 66 made of shape-memory material capable of presenting a single shape material effect, such as a for example an alloy of nickel and titanium, sometimes known as nitinol.

Each rod 66 is substantially radial or obliquely inclined relative to a radius, and has a radially inner end fastened to the outside surface of the tube 42, e.g. by welding or brazing, and a radially outer end carrying a bearing shoe 68 constituted by an annular sector of a common material, such as steel, for the purpose of being pressed against the inside surface 40 of the shaft 26, the shoe 68 being fastened to the rod 66 likewise by welding, brazing, or the like.

In the retracted configuration shown in FIG. 2, the radially outer ends of the rods 66 are curved inwards so that the shoes 68 are located at a short distance from the tube 42 adjacent to one another, thereby forming a ring that is substantially continuous.

In the deployed configuration shown in FIG. 3, the rods 66 are straight, such that the bearing shoes 68 are spaced away from the tube 42 and are pressed against the inside wall 40 of the low-pressure turbine shaft 26, so as to center the tube 42 relative to the shaft 26.

The rods 66 are deployed from their retracted configuration by virtue of the single shape-memory effect.

The rods 66 are initially shaped in their deployment position at a temperature that is higher than a transition temperature $T_t$ of the shape-memory material so that the material is then in an austenitic phase. Thereafter the centering device 66, 68 is mechanically retracted by pushing the bearing shoes 68 radially inwards, with this being done at a temperature that is lower than the above-mentioned transition temperature $T_t$, so that the shape-memory material is then in a martensitic phase.

The centering device 66, 68 can then be mounted on the tube 42 while it is outside the shaft 26, and the tube 42 can then be put into place inside the shaft 26.

In order to center the tube 42, it then suffices to raise the temperature of the rods 66 of the centering device to a temperature above the austenitic phase transition temperature $T_t$ of the material forming the rods, e.g. by blowing hot air inside the shaft 26, thereby causing the material to go into its austenitic phase and cause the rods 66 to deform by the single shape-memory effect, until they return to their initial shape as trained while in the austenitic phase, corresponding to the centering device 66, 68 being in its deployed configuration.

It is preferable for the shape-memory material selected to form the rods 66 to have a transition temperature $T_t$ that is sufficiently high, e.g. greater than 100° C., to avoid any risk of the centering device deploying in untimely manner.

The above-described device is sufficiently compact in its retracted position to enable it to go past those zones of the shaft that present a small inside diameter without any risk of damaging the inside wall of the shaft.

The device may also be used without risk in engines of small diameter.

Figure 4:
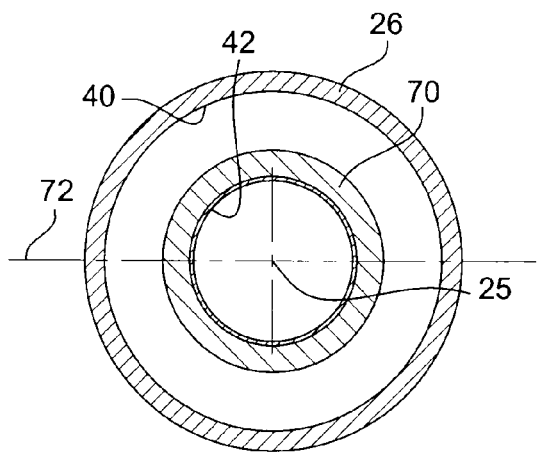
FIGS. 4 and 5 are views similar to FIGS. 2 and 3 respectively, showing a centering device constituting a second embodiment of the invention.
Figure 5:
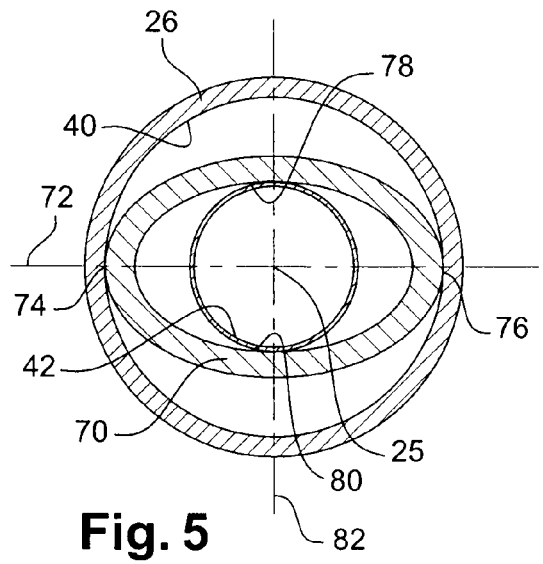

FIGS. 4 and 5 show a second embodiment of the invention in which the deformable means of the centering device comprise a ring 70 made of a shape-memory material that is capable of presenting a double shape-memory effect, such as an alloy of the CuAlNi, CuZnAl, CuAlBe, NiTi, or indeed NiTiNb type, so as to make it possible both to deploy and to retract the device by heating or cooling it.

In order to implement the double shape-memory effect, the ring 70 is initially subjected to a training stage comprising a series of thermomechanical cycles in which it is shaped in alternation to have a circular shape, at a temperature below the transition temperature $T_t$ of the shape-memory material to the austenitic phase, such that this material is then in its martensitic phase, and into an oval shape by lengthening the ring in a plane 72 containing the axis 25 of the shaft 26, at a temperature higher than the transition temperature $T_t$ of the shape-memory material, such that the material is in its austenitic phase.

The ring 70 is then mounted around the tube 42.

FIG. 4 shows the device in its retracted configuration, the ring 70 being in its circular shape so as to surround the tube 42, presenting a compact radial configuration so as to enable the tube 42 to pass through the narrow portions presented by the inside wall of the shaft 26 without risk for the shaft.

The shape-memory material constituting the ring 70 has a negative transition temperature $T_t$ lying in the range −90° C. to −50° C. approximately, in order to avoid any risk of untimely retraction of the device, while still enabling a phase transition to be implemented under industrial conditions.

The passage of the device to its retracted configuration as shown in FIG. 4 can be triggered by cooling it to below its transition temperature $T_t$, e.g. by immersing the device in liquid nitrogen which can easily inserted into the shaft 26.

FIG. 5 shows the device in its deployed configuration, the ring 70 then having its oval shape, such that two zones 74 and 76 of its outside surface, situated in the vicinity of the elongation plane 72 of the ring, are pressed against the inside wall 40 of the shaft 26, while two other zones 78 and 80 of its inside surface, zones that are situated in the vicinity of a plane 82 likewise containing the shaft axis 25 and perpendicular to the ring elongation plane 72, continue to press against the outside wall of the tube 42.

This configuration thus enables the tube 42 to be centered relative to the shaft 26.

The passage of the device into this configuration can be triggered by the device returning to a temperature higher than the transition temperature $T_t$ of the shape-memory material, e.g. merely by returning to ambient temperature.

In this way, the device remains deployed at the temperature at which the turbojet operates without any risk of undesired retraction.

The advantage of using a double shape-memory effect lies in the possibility of causing the centering device to retracted while it is already mounted inside the shaft 26, e.g. for a maintenance operation, with this being possibly merely by cooling the device.

In a variant, the ring 70 may have a deployed configuration that is polygonal in shape with rounded vertices, or any equivalent shape suitable for enabling certain external portions of the ring 70 to bear against the inside surface 40 of the shaft 26 while also enabling the tube 42 to be kept pressed against certain inside portions of the ring 70.

Figure 6:
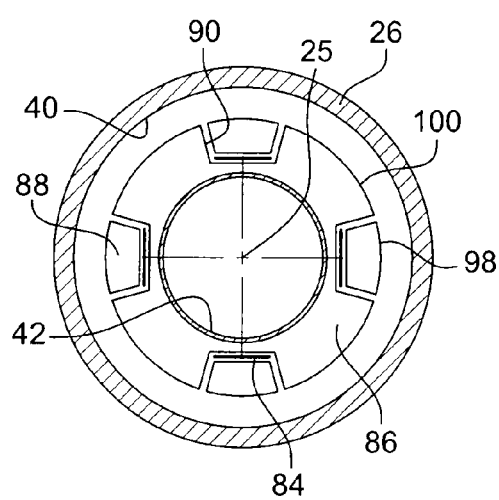
FIGS. 6 and 7 are views similar to FIGS. 2 and 3, respectively, showing a centering device constituting a third embodiment of the invention.
Figure 7:
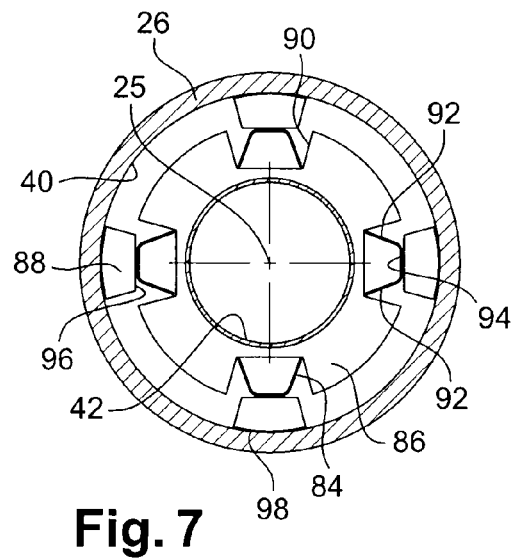

In a third embodiment shown in FIGS. 6 and 7, the deformable means comprise plates 84 of shape-memory material suitable for presenting a double shape-memory effect, which plates are interposed between a ring 86 and bearing shoes 88.

The ring 86, e.g. made of a common material such as steel, includes hollow portions or cups 90 formed in its outside surface and regularly distributed around the axis 25 of the ring, there being four of these cups 90, for example.

By way of example, each cup 90 is frustoconical in shape with a flat bottom, and it designed to house a bearing shoe 88 of substantially complementary shape, e.g. made of a material analogous to that of the ring 86, together with a plate 84 of shape-memory material that is interposed between the bearing shoe 88 and the bottom of the cup 90 and that is configured to push the bearing shoe 88 radially outwards on being subjected to a temperature higher than the transition temperature $T_t$ of the shape-memory material, and to retract the bearing shoe 88 radially inwards into the cup 90 on being subjected to a temperature lower than the transition temperature $T_t$.

In order to implement the double shape-memory effect, the plates 84 are initially subjected to a training stage comprising a series of thermomechanical cycles in which each plate 84 is shaped in alternation to have a flat shape at a temperature lower than the transition temperature $T_t$ of the shape-memory material into the austenitic phase, such that the material is then in its martensitic phase, and to have an arcuate shape, at a temperature greater than the transition temperature $T_t$, such that the shape-memory material is then in its austenitic phase.

Thereafter, the plates 84 can be installed between the bearing shoes 88 and the bottoms of the cups 90 in the ring 86 so that two opposite edges 92 of each plate 84 are fastened to the bottom of the corresponding cup 90, e.g. by brazing, welding, or the like, while a middle zone 94 of the radially outer surface of each plate 84 is fastened to a radially inner face 96 of the corresponding bearing shoe 88, likewise by brazing, welding, or the like.

FIG. 6 shows the device in its retracted configuration, the plates 84 being in their flat shape so that the bearing shoes 88 are not in contact with the inside surface of the shaft 26 and the radial size of the device is as small as possible. In the particular example shown, the radially outer surface 98 of each bearing shoe 88 is flush with the outside surface 100 of the ring 86.

As in the preceding example, the shape-memory material used has a transition temperature $T_t$ that is negative, lying in the range −90° C. to −50° C., approximately, so as to avoid any risk of the device retracting in untimely manner, the passage of the device to its retracted configuration as shown in FIG. 6 being triggered by immersing the device in liquid nitrogen, or the like.

FIG. 7 shows the device in its deployed configuration, the plates 84 being in their arcuate shape such that the radially outer surface 98 of each bearing shoe 88 bears against the inside surface 40 of the shaft 26 in order to center the tube 42.

As in the preceding example, the passage of the device into this configuration can be triggered by returning to ambient temperature.

The three embodiments described above are given as examples of the invention that are non-limiting, both from the point of view of geometrical shape and from the point of view of implementing single or double shape-memory effects.

In particular, a double shape-memory effect of the type described in the second and third embodiments may be combined with the shape of the first embodiment in order to benefit from the advantages described above in terms of reversibility, e.g. in order to make maintenance operations easier. Naturally, this requires a stage of training the rods, analogous to that described above.

The invention is applicable to centering any part inside a tube or a hollow shaft, and particularly but not exclusively to centering a "center vent" tube in a hollow shaft of a turbomachine turbine.

What is claimed is:

1. A device for centering a part inside a hollow shaft in a turbomachine, the device comprising:
   radially deformable means interposed between the part and the hollow shaft and including bearing members for bearing against an inside surface of the shaft, the bearing members being suitable for being spaced away from the inside surface of the shaft to enable them to be moved inside the shaft,
   wherein the deformable means are made at least in part out of a shape-memory material suitable for radially pressing the bearing members against the inside surface of the shaft, or for radially spacing the bearing members away therefrom when the material is subjected to a predetermined temperature,
   wherein the part is a tube, and
   wherein the deformable means comprise rods of shape-memory material, each having a radially inner end fastened to an outside surface of the tube and a radially outer end carrying a bearing shoe for bearing against the inside surface of the shaft, the radially outer end of each rod being suitable for curving radially inwards by deformation of the shape-memory material in order to move the corresponding bearing shoe away from the inside surface of the shaft.

2. The device according to claim 1, wherein the deformable means are initially shaped into a position for bearing against the shaft at a temperature higher than a transition temperature $T_t$ of the shape-memory material, and are then retracted under mechanical stress at a temperature lower than the transition temperature $T_t$, so as to be capable subsequently, by a single shape-memory effect, of pressing the bearing members against the shaft by deformation of the shape-memory material when it is heated to a temperature higher than the transition temperature $T_t$.

3. The device according to claim 2, wherein the transition temperature $T_t$ of the shape-memory material is higher than 100° C.

4. A device according to claim 1, wherein the deformable means are initially subjected to thermomechanical cycles in which they are shaped in turn in a deployment position at a temperature higher than a transition temperature $T_t$ of the shape-memory material and then in a retraction position at a temperature that is lower than the transition temperature $T_t$, so as to be subsequently suitable for pressing the bearing members against the hollow shaft by the shape-memory material deforming on being heated to a temperature higher than the transition temperature $T_t$, and for retracting the bearing members by the shape-memory material deforming on being cooled to a temperature lower than the transition temperature $T_t$.

5. The device according to claim 1, wherein each bearing shoe is in the form of a ring sector suitable for matching the shape of the inside surface of the shaft when in the deployed position, with the set of bearing shoes, when in the retracted position, forming a substantially continuous ring surrounding the tube.

6. A turbomachine including at least one centering device of the type described in claim 1.

* * * * *